US011498478B2

(12) United States Patent
Wendt (10) Patent No.: US 11,498,478 B2
(45) Date of Patent: Nov. 15, 2022

(54) ELECTRIC SCOOTER LIGHTING FOR IMPROVED CONSPICUITY

(71) Applicant: Honda Motor Co., Ltd., Tokyo (JP)

(72) Inventor: Peter Wendt, Redondo Beach, CA (US)

(73) Assignee: Honda Motor Co., Ltd., Tokyo (JP)

(*) Notice: Subject to any disclaimer, the term of this patent is extended or adjusted under 35 U.S.C. 154(b) by 300 days.

(21) Appl. No.: 16/691,888

(22) Filed: Nov. 22, 2019

(65) Prior Publication Data
US 2021/0155153 A1    May 27, 2021

(51) Int. Cl.
*B60Q 1/26* (2006.01)
*B60Q 1/30* (2006.01)
*B60Q 1/46* (2006.01)
*B60Q 1/32* (2006.01)
*B60Q 1/08* (2006.01)
*B60R 11/02* (2006.01)
*G06V 20/56* (2022.01)
*B62J 45/40* (2020.01)

(52) U.S. Cl.
CPC .......... *B60Q 1/2619* (2013.01); *B60Q 1/085* (2013.01); *B60Q 1/30* (2013.01); *B60Q 1/32* (2013.01); *B60Q 1/46* (2013.01); *B60R 11/0241* (2013.01); *B60R 11/0264* (2013.01); *G06V 20/588* (2022.01); *B62J 45/40* (2020.02); *B62K 2202/00* (2013.01); *B62K 2204/00* (2013.01)

(58) Field of Classification Search
CPC ........ B60Q 1/30; B60Q 1/085; B60Q 1/2619; B60Q 1/32; B60Q 1/46; B62K 2202/00
See application file for complete search history.

(56) References Cited

U.S. PATENT DOCUMENTS

| 7,722,231 | B2 | 5/2010 | Carillo et al. |
| 9,247,625 | B2 | 1/2016 | Recker et al. |
| 10,133,548 | B2 | 11/2018 | Krispin |
| 2020/0124430 | A1* | 4/2020 | Bradlow ............... B62J 45/422 |

(Continued)

FOREIGN PATENT DOCUMENTS

| CH | 301322 A | 8/1954 |
| DE | 102011002894 A1 | 7/2012 |
| DE | 202016004591 U1 | 9/2016 |

(Continued)

*Primary Examiner* — Joseph L Williams
(74) *Attorney, Agent, or Firm* — Plumsea Law Group, LLC (57) ABSTRACT

An electric scooter with a lighting system that includes a rear mounted light that projects light upward and toward the front of the scooter to illuminate the back of a rider, and side lights that project light to illuminate the sides of a scooter. The lighting system employs a multi-faceted approach to vary intensity and effects for improved visibility in traffic. The light system can be configured to automatically illuminate or change effects in response to road or environmental conditions, or in response to existing or future roadway infrastructure such as autonomous traffic infrastructure or adaptive traffic control systems. The light system may also be integrated with the braking system for signaling a slow down or stop. The system may be controlled by communication between an onboard processor and a personal computing device such as a smart phone that can be docked on the scooter and provide display of information and a means of input.

20 Claims, 4 Drawing Sheets

(56) References Cited

U.S. PATENT DOCUMENTS

2020/0143237 A1\* 5/2020 Gordon .................... G06N 3/08
2020/0307731 A1\* 10/2020 Neuman .................. B62J 45/41

FOREIGN PATENT DOCUMENTS

| JP | 2001055183 A | 2/2001 |
| JP | 2014118041 A | 6/2014 |
| KR | 20170142009 A | 12/2017 |
| KR | 101984133 B1 | 5/2019 |
| WO | 2012175988 A2 | 12/2012 |

\* cited by examiner

ELECTRIC SCOOTER LIGHTING FOR IMPROVED CONSPICUITY

BACKGROUND

1. Technical Field

The disclosure herein relates to lighting for an electric scooter to improve conspicuity of a rider in traffic, and in particular, of a rider in traffic at night.

2. Description of Related Art

With rising prices of gasoline and automobiles, many people may turn to other more cost efficient modes of transportation such as, for example, mopeds, bicycles, scooters and, more recently, electric transport devices such as stand-up electric scooters or kick scooters. Personal transport devices such as scooters may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network. Depending on the local laws and regulations, personal transport devices such as electric scooters may be required to remain in the flow of pedestrian or vehicular traffic. In a pedestrian traffic flow, the electric scooter may be required to use a cross-walk much as a pedestrian should. In a vehicular traffic flow, the electric scooter may be required to be operated much like a bicycle which should adhere to vehicle moving laws and norms. However, whether used in either type of traffic flow, electric scooters may not include head lights or tail lights as found on conventional vehicles such automobiles, and the small size of the scooters may limit the placement of lights that would make its presence known by making the user more visible to other vehicles and users.

There is thus a need in the art for a system and method that improves the lighting and illumination provided by an electric scooter, and therefore the overall conspicuity of users riding electric scooters.

SUMMARY

The techniques of the exemplary embodiments described herein provide a method and system for providing an automated lighting system to enhance the visibility of a user of an electric scooter, thereby making the presence of a user operating the electric scooter on roadways more apparent. The lighting enhancements will also be beneficial if the electric scooter is required to operate in pedestrian traffic as well.

In one aspect, the disclosure provides an electric scooter having a frame assembly including a foot deck configured for a user to stand thereon, a wheel assembly connected to the frame assembly, a steering assembly connected to the frame assembly and the wheel assembly, a lighting system disposed at least on a rear of the frame assembly and configured to emit light upwards and forward toward a front of the electric scooter, and at least one side light disposed along the foot deck area of the electric scooter to emit light. The lights may be automatically activated in response to conditions or detection of existing infrastructure components.

In another aspect of the disclosure, an electric transport device or scooter is provided having a frame assembly including a foot deck configured for a user to be positioned thereon, a wheel assembly connected to the frame assembly, a steering assembly pivotally connected to the frame assembly to facilitate steering of the electric scooter, a lighting system disposed on a rear of the frame assembly and configured to emit light upwards and forward towards a front of the frame assembly, and at least one side light configured to emit light from a side surface of the frame assembly. Also provided is a communication dock mounted on the frame assembly configured to receive a smart phone and a processor configured to communicate with the smart phone when the smart phone is mounted in the dock. When the smart phone is mounted in the dock and when the smart phone communicates a predetermined activity to the processor, the processor automatically illuminates at least one of the lights or changes the condition of one of the lights.

In another aspect, a method for automated illumination of lighting on an electric scooter is provided. The method includes providing an electric scooter having a lighting system including at least one light unit disposed on a rear of the electric scooter and configured to emit light upwards and toward a front of the electric scooter, and at least one side light disposed on a side surface of the electric scooter, transmitting data between environmental infrastructure and a controller for the lighting system of the electric scooter, communicating to the controller that the electric scooter is approaching an intersection between two roadways, and automatically activating the lights on the electric scooter in response to communication that the electric scooter is approaching the intersection.

Other systems, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The exemplary embodiments of the disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

The exemplary embodiments described herein provide an electric scooter with automated control of enhanced lighting features, thereby increasing the visibility of a user riding the electric scooter and improving the likelihood of a user's presence being more apparent on roadways shared with automotive vehicles. While this disclosure illustrates and describes an exemplary electric scooter for stand-up "kick"

riding, it will be understood that any type of personal transport vehicle with stand-up riding or seated riding are well within the scope of the disclosure. The disclosure is concerned with improving the conspicuity of users of personal transport devices when traveling in or around traffic with larger, heavier automotive vehicles. Depending on the conditions, personal transport devices such as scooters, bicycles, mopeds and motorcycles, may be less visible than other larger automobiles when in or around traffic.

As used herein, an electric scooter is a term used mainly to describe the stand-up kick scooter that is electrically powered. This is a type of personal transport device that is gaining ridership. The principles of the lighting system for the electric scooter described herein may be applied to other types of personal transport devices that are motorized such as bicycles, wheelchairs, personal transporters, or the like, and which are relatively small compared with vehicles, and therefore may benefit from the riders or users being illuminated to enhance visibility.

Figure 1:
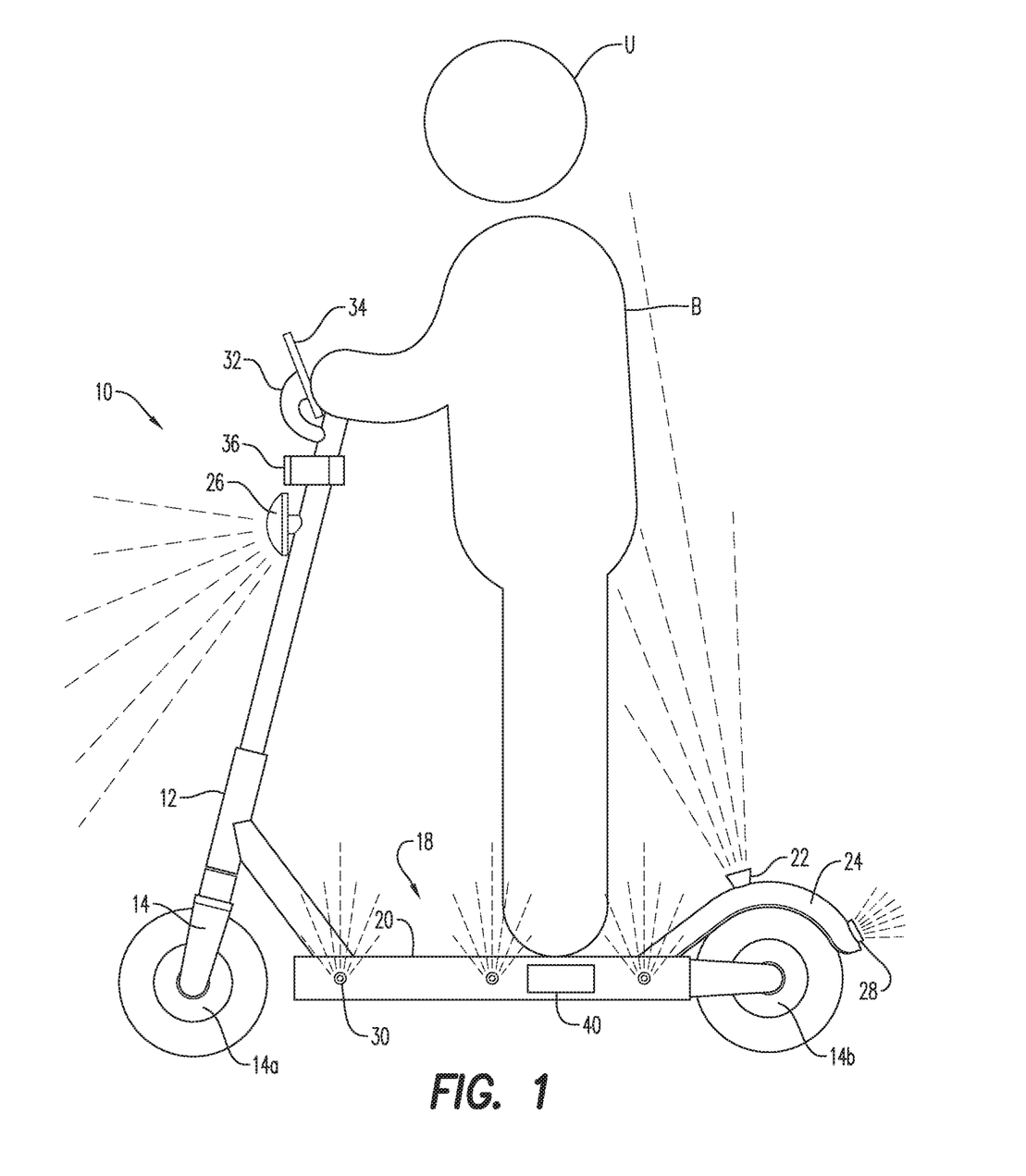
FIG. 1 is a side view of an electric scooter according to an exemplary embodiment of the disclosure.
Figure 2:
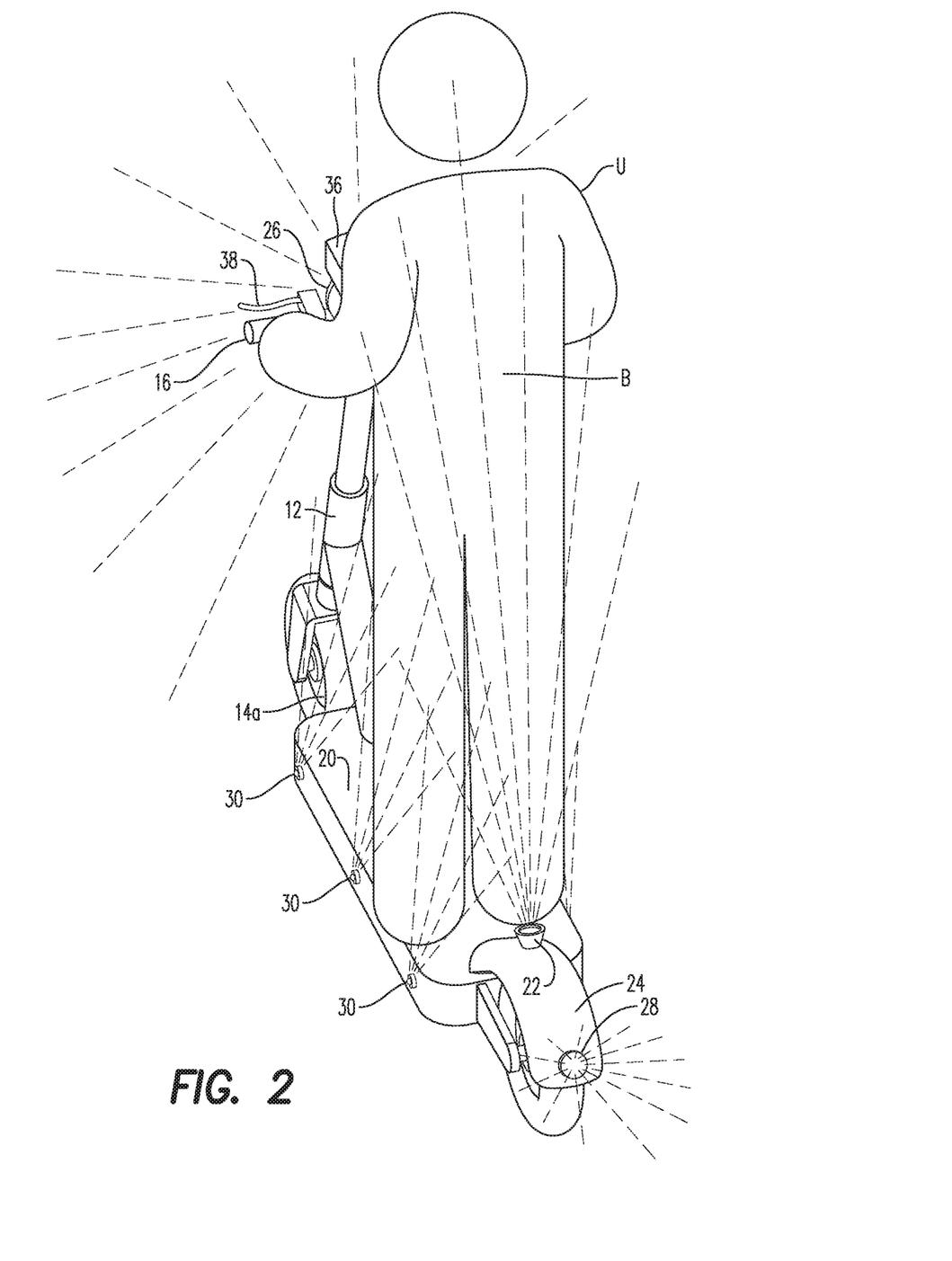
FIG. 2 is a rear perspective view of the electric scooter.

A schematic representation of an electric scooter, is shown generally in FIGS. 1 and 2 by reference numeral 10. In accordance with an exemplary embodiment of the disclosure, the scooter 10 may include a frame assembly 12, a wheel assembly 14 connected to the frame assembly 12 and a steering assembly 16 connected to the frame assembly 12 and the wheel assembly 14. The frame assembly 12 may define a personal space 18 for a user U to ride and operate the scooter 10. The frame assembly 12 may include a foot deck area 20 to accommodate the feet of the user U. In the exemplary embodiment, the wheel assembly 14 may include a front wheel assembly 14a and a rear wheel assembly 14b. The steering assembly 16 may be pivotally connected to the frame assembly 12 to facilitate steering the scooter 10. A braking system 38 may also be provided to allow the user U to stop the forward movement of the scooter 10. The braking system 38 may include a hand actuated lever as illustrated or a foot actuated brake. It is also contemplated that the braking system may be partially or wholly automated with use of proximity sensors for neighboring vehicles or objects, or sensors that receive input from roadway infrastructure such as traffic control devices or the like. As known in the art, the scooter 10 includes an electric motor (not shown) powered by one or more rechargeable batteries 40. Since the design of the scooter 10 is a generally known configuration, a more detailed description thereof is omitted.

A personal transport device such as an electric scooter is smaller than other vehicles in traffic, and much of the structure of the scooter is close to the ground. The present disclosure addresses the need for improved visibility of the rider on the scooter by other vehicles and drivers in traffic to make its presence known by employing a multi-faceted lighting system. The lighting system may be used in daylight as well as darkness and may employ various combinations of intensities of light and light effects to call visual attention to the scooter and rider. In addition to being manually actuated, the lighting system of the present disclosure may be configured to automatically illuminate or change light effects in response to road or environmental conditions. The device can include a variety of information gathering aspects such as sensors that detect lighting condition, sensors that detect certain sounds such as emergency sounds, cameras or other optical devices that can detect markings on roadways or changes in roadways, and receivers that can receive information from roadway infrastructure or other vehicles. The information that may be received by the device can include existing or future roadway infrastructure such as autonomous traffic infrastructure or adaptive traffic control systems which transmit or broadcast traffic information to vehicles and vehicle controllers. The information may include speed limits, traffic control signals, hazard warnings, etc. In this disclosure the term roadway infrastructure is intended to encompass these types of features and information.

The scooter 10 may include a lighting system having at least one light emitting unit 22 disposed at the rear of the scooter 10, such as on a rear fender 24 as illustrated. The lighting system may use power from the battery 40 or it may be powered as the user uses the scooter 10. The lighting unit 22 may be configured to provide a light beam that projects upwards and forward towards the steering assembly 16 so as to illuminate the back or back side B of the user U riding on the scooter 10. The lighting unit 22 may include, for example, at least one LED light, but any other type of known lighting could of course also be used, such as halogen, fluorescent, incandescent, laser diode, or the like. The lighting unit 22 may illuminate the back side of user U so as to provide a large illuminated presence that may easily be seen by drivers of automobiles, thus increasing visibility and awareness of the user. That is, since the scooter 10 is itself relatively small and low to the ground, there may be very limited space for the placement of lights that would be within the normal field of view of an automobile driver. In other words, when an automotive vehicle is approaching the scooter 10, the driver's line of sight may be directed forward towards the back of the user on the scooter 10. By aiming the light beam emitted from lighting unit 22 upwards and forwards, the back side B of the person riding the scooter may be illuminated, thereby increasing the conspicuity of the electric scooter and leading to improved visibility and awareness of the scooter and its user. Moreover, the visibility is improved if the rider is wearing white or reflective clothing.

The lighting unit 22 may emit constant lighting onto the back side B of the rider in an exemplary embodiment of the disclosure. In a further aspect of the disclosure, however, the emitted lighting from lighting unit 22 may also be a timed or pulsed lighting so as to produce a strobe light effect or varying light intensities in order to further increase visibility of the user. The use of pulsed lighting may be beneficial to increase visibility because the motion or movement of the flashing light may further attract attention to the scooter 10, thereby further increasing the visibility thereof. The projected light emitted from the lighting unit 22 may generally be a white light, but red light may be used to increase awareness, as could any other color.

Still further, the lighting unit 22 may be in communication with a braking system 38 on the scooter 10. In such an embodiment, a light being emitted from lighting unit 22 and projected upwards and forwards onto the back B of the user U will turn a different color such as a red light projected onto the back B of the user U when the brakes are applied by the user to slow or stop the scooter. The red lighting may indicate that the brakes are being activated to the automobile traffic or others following behind the scooter 10 or in close proximity thereto. The red illumination lighting emitted from the lighting unit 22 may be a constant red or a flashing red light similar to the white illumination lighting. Still further, if the projected illumination lighting from lighting unit 22 is normally a red light, the red light may change to a brighter red light when braking to provide increased awareness. It may also be possible to use different colors or lighting effects as would be appreciated by one skilled in the art. The braking indication lighting may also be responsive to roadway infrastructure or due to detection of roadway features by an onboard sensor. An example of this is a sensor on the foot deck that may detect stripes on the roadway indicating a pedestrian crosswalk. The braking system and the braking indication lighting may respond to changes in the roadway as detected by a sensor or combination of sensors.

In an exemplary embodiment of the disclosure, the lighting unit 22 is activated and turns on automatically whenever the scooter 10 is running. That is, when the scooter 10 may be first started, an electric circuit connected to lighting unit 22 may be closed such that light is emitted upwards and forwards toward the steering assembly 16, thereby illuminating the back B of the user standing on the foot deck area 20 of the scooter 10.

In a further embodiment of the disclosure, and in an effort to better conserve battery life, one or more sensors (not shown) may be provided such that the lighting unit 22 may be activated and turns on automatically only during operation in low light. More particularly, light sensors to detect the ambient light in the external environment may activate the lighting unit 22 when a predetermined low level of ambient light is sensed, such as after dusk, nighttime, cloudy or overcast day, and similar situations.

In yet a further embodiment, an on/off switch (not shown) may be provided to allow the user U of the scooter 10 to manually control when the lighting unit 22 is activated to turn on and off the emitted light aiming at the back side of the user.

In an exemplary embodiment of the disclosure, the scooter 10 may include a dock 32 for receiving a smart phone 34 or other type of portable computing device. With an application installed on the smart phone 34, the phone 34 may function as a display screen for the scooter 10 and provides a communication interface to an onboard scooter controller or processor 36. The communication between the phone and the onboard controller/processor may be accomplished by a variety of ways such as Bluetooth® or other near field communication protocols. The display screen of the phone 32 may provide information to the user regarding, for example, battery life, status of lighting unit 22, distance traveled, speed, navigation information, hazard information and roadway infrastructure signals and readings. The lights on the lighting system may provide for user preferences for colors which may be selected on the smart phone application. It is also possible that the colors or lighting effect of the various lights on the lighting system may be dependent upon regulations and traffic laws, and the smart phone application may be programmed to comply with regulations of the location of use or provide selectivity to the user.

The application on the smart phone 34 may also monitor and/or control some of the operating systems of the scooter 10. By way of example, in one embodiment, the smart phone application may be configured to communicate with the processor 36 to control the activation of the lighting unit 22. That is, the smart phone 34 may communicate the time for dusk and/or sunrise to the scooter processor 36 so as to activate the lighting unit 22 at the appropriate time and lighting conditions. The smart phone application may also provide the user with a range of options for how to increase visibility by employing one or more of the lighting options and effects. These may be preprogrammed and communicated between the smart phone and the processor, or may be in response to inputs from the roadway infrastructure or inputs from neighboring vehicles or objects sensed by the onboard sensors. Use of the smart phone 34 may increase the reliability and strategic timing of the lighting unit 22 being activated at the appropriate time and intensity.

The scooter 10 may also include a head light 26 and/or a tail light 28 to further increase the visibility of the scooter during both daylight and nighttime hours.

Still further, in the exemplary embodiment of the disclosure, one or more side lights 30 may be provided on the left and/or right sides of the scooter 10. As shown in FIGS. 1 and 2, the side lights 30 project upwards to also illuminate the sides of the user U and thus increase the conspicuity of the rider. In further aspects of the disclosure, the side lights may also project downwards to illuminate the ground surface, or may project outwards at least in a direction of a plane of the foot deck area 20. The side lights 30 may also be configured to project a travel lane on the road surface on each side of the electric vehicle 10. Similar to lighting unit 22, the side lights 30 may automatically be activated when the scooter 10 is moving or only during time of low ambient light, as detected by sensors or communicated to the processor 36 from the smart phone 34. The side lights 30 may emit white, yellow, amber or red light to increase visibility, or any other color as desired. Also similar to light unit 22, the side lights 30 may emit a constant light or a pulsed, flashing light.

Figure 3:
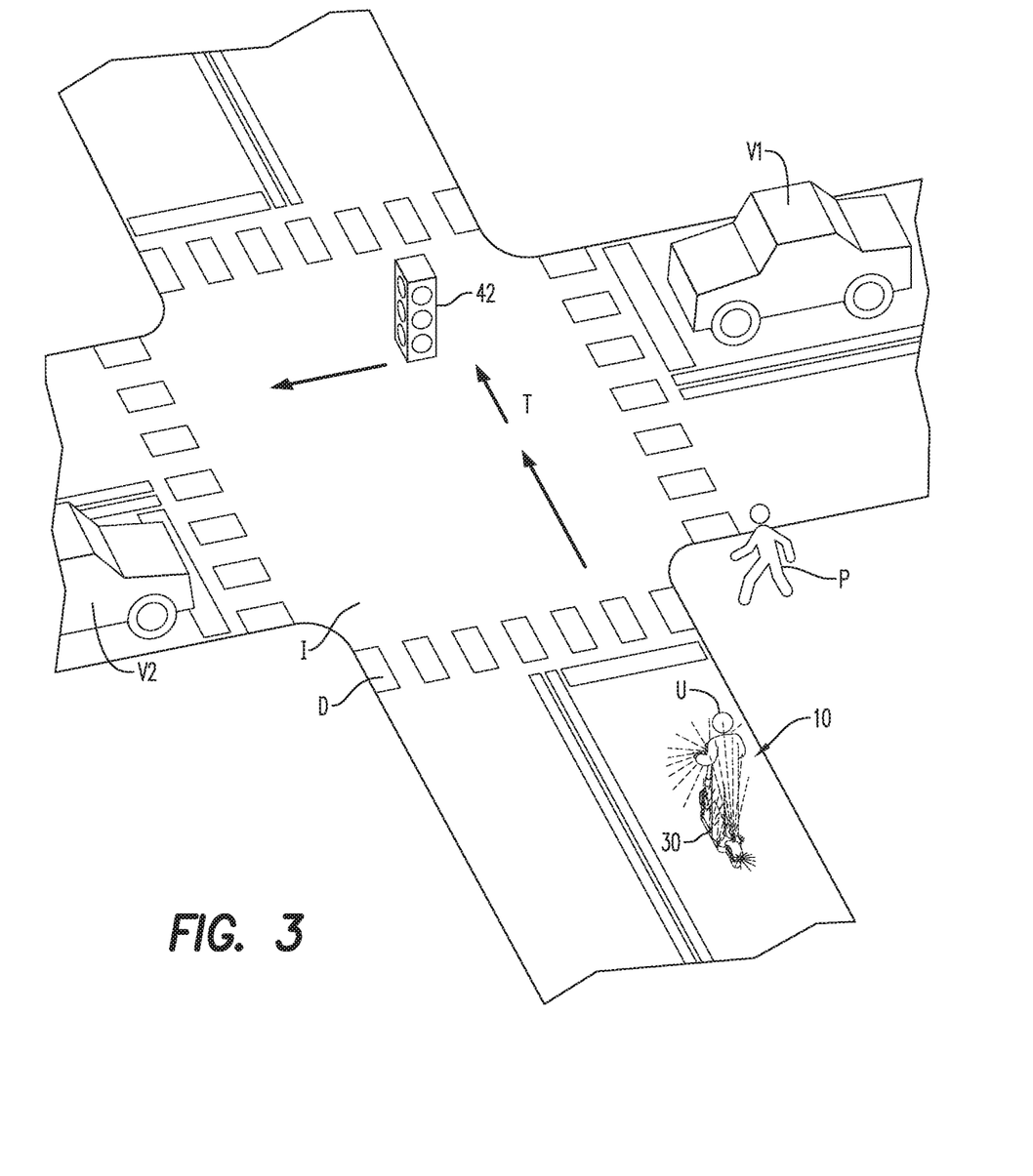
FIG. 3 is a schematic representation of the electric scooter when used on roadways along with vehicular traffic according to an exemplary embodiment of the disclosure.

According to a further embodiment of the disclosure, the side lights 30 may be automated in such a manner that the side lights 30 are illuminated when an additional visible presence would be desirable for increased awareness, such as when the electric vehicle 10 is crossing or passing through an intersection. That is, with reference to FIG. 3 and FIG. 4, the smart phone 34 on the scooter 10 may communicate with existing roadway infrastructure in the environment 42, such as a traffic light, through the transmission of data to thereby recognize that the scooter is approaching an intersection I and then control the processor 36 to activate the side lights 30 on the scooter 10. As noted above, the light emitted may be a constant light or a pulsed, flashing light, and the light may be white, yellow, amber, red, or any other color, in order to draw an automobile driver's attention to the scooter 10. As intersections have increased traffic flow with automotive vehicles, such as V1 and V2 shown in FIG. 3, the lighting emitted from the side lights 30, in addition to the lighting unit 22, may improve the visibility of the user U. In addition to when passing straight through the intersection I, increased visibility is particularly desirable in a situation where the scooter 10 may be turning left at an intersection I and there is a vehicle V2 on the cross street of the intersection I. As schematically illustrated in FIG. 3, the scooter 10 must pass in front of vehicle V2 in order to make the left turn T. As the scooter 10 may be substantially perpendicular to the vehicle V2 as it begins the left turn, however, the front and rear of the scooter 10, and thus any lighting on the front and rear of the scooter 10, may not be directly visible by the driver of the vehicle V2. Illumination of the side lights 30 in this situation may create improved visibility of the rider and scooter 10 because the side lights 30 and sides of the rider are directly in line with the line of sight from the vehicle V2 as the scooter 10 proceeds into the intersection I to make a left turn T. As such, awareness is improved as the scooter 10 turns left at an intersection between two crossing streets.

In a further embodiment, rather than the lighting unit 22 being automatically activated at all times when the scooter 10 is running during daylight hours, the lighting unit 22 and the side lights 30 may both be automated such that they are only illuminated during daylight hours when the scooter is approaching an intersection I. The smart phone 34 on the scooter 10 may communicate with the traffic light or other roadway infrastructure 42 to detect the approaching intersection I and then signals the processor 36 to activate the lighting unit 22 and the side lights 30 on the scooter.

Alternatively, in a further embodiment of the disclosure, the lighting on the scooter 10 may be automated based upon input by a scanner or camera system 44. The scanner/camera system 44 may be provided on a front of the scooter 10 to recognize when the scooter 10 crosses a solid line or a dashed line typically found on a pedestrian crosswalk in an intersection. Recognition of the solid line or dashed line by the scanner/camera system 44 may be communicated to the processor 36 in order to then activate the side lights 30 (and may also activate the lighting unit 22 as well if not already activated). Hence, once again, the lighting on the scooter 10 may be illuminated as the scooter 10 passes through the intersection 10. This aspect of the disclosure is particularly useful when the scooter 10 is used as a personal transport device for a user U within the flow of pedestrian traffic, when it is permitted by local regulations. In such instance, the scanner/camera system 44 provided on the front of the scooter 10 recognizes when the scooter 10 crosses the dashed lines D found on the pedestrian crosswalk in an intersection and the side lights 30 and/or lighting unit 22 will be illuminated after passing over the dashed lines D as the scooter traverses the crosswalk. Thus, the lighting system according to the disclosure herein improves the conspicuity of the scooter 10 and the user U when the scooter 10 is used in a pedestrian right-of-way in addition to when it used on roadways in vehicular traffic.

According to yet a further embodiment of the disclosure, and with reference to FIG. 3, another situation making an additional visible presence desirable for increased awareness is when a pedestrian P is in the proximity of the scooter 10, such as when a pedestrian P is in the crosswalk delineated by the dashed lines D and the electric vehicle 10 is approaching the intersection. In this instance, the smart phone 34 on the scooter 10 may communicate with another smart phone (not shown) being carried by the pedestrian P. When the smart phone 34 identifies another smart phone in the proximity of the scooter 10, the smart phone 34 signals the processor 36 to activate the side lights 30 and/or lighting unit 22 on the scooter 10. The increased illumination of the lighting on the scooter 10 may draw the attention of the pedestrian P to the presence of the scooter and thus improves awareness for both the user U of the scooter 10 and the pedestrian P.

Figure 4:
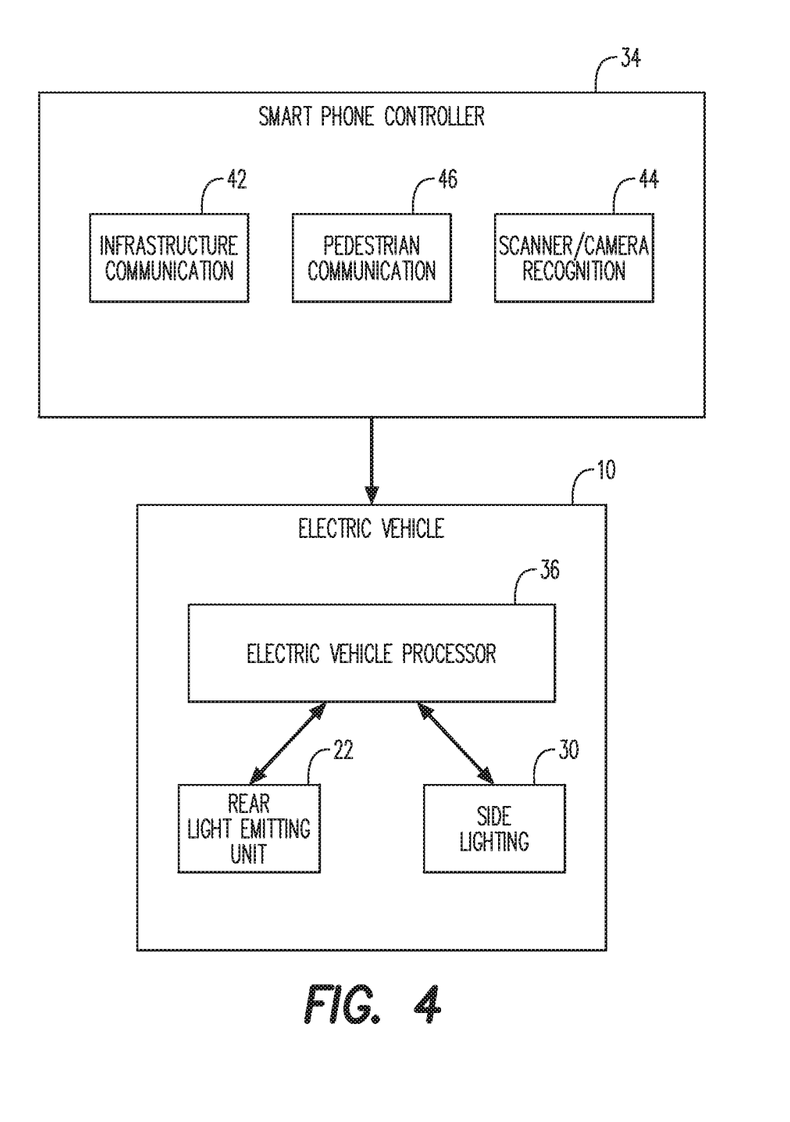
FIG. 4 is a schematic diagram of components of a lighting system on the electric scooter according to an exemplary embodiment of the disclosure.

As shown schematically in FIG. 4, the smart phone 34 may be docked to the scooter dock with a direct connection, or may communicate with the scooter 10 via any near field communication protocol. The scooter 10 has an onboard processor 36 that may control the rear light emitting unit 22 and side light unit 30 and may also obtain inputs from any number of onboard sensors which may detect proximity to other vehicles or objects, or camera device that may detect roadway conditions such as a lined cross-walk as discussed previously. The smart phone application may monitor and control the scooter processor and may take advantage of other features of the smart phone such as the availability of roadway infrastructure information to be received by the smart phone, navigation information and the smart phone camera or accelerometer and other sensors.

While the electric vehicle relative to the exemplary embodiment here is illustrated and described as an electric scooter, any type of stand up, powered foot-deck-based vehicle could be employed, such as an electric skateboard, one- and two-wheeled self-balancing boards, etc.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. An electric transport device comprising:
   a frame assembly including a foot deck configured for a user to stand thereon;
   a wheel assembly connected to the frame assembly;
   a steering assembly connected to the frame assembly and the wheel assembly;
   a lighting system disposed on the frame assembly comprising a central rear light emitting light upwards and forwards toward a front portion of the electric transport device, and at least one side light disposed along the foot deck area of the electric transport device to emit light; and
   a processor for the lighting system that receives information from a sensor on the device and from roadway infrastructure to control illumination of the central rear light and the side light;
   wherein the side light is automatically illuminated by the processor in response to information received.

2. The electric transport device according to claim 1, wherein the information received is a predetermined activity for automatically illuminating the side light.

3. The electric transport device according to claim 1, further comprising a dock configured to receive a smart phone and a computer in communication with the dock.

4. The electric transport device according to claim 3, wherein, when the smart phone is received in the dock, the dock is in communication with the processor to illuminate the side light when the electric vehicle passes into a traffic intersection.

5. The electric transport device according to claim 1, wherein the sensor is a light sensor for detecting ambient light conditions and is configured to communicate with the processor for controlling illumination of the lighting system to enhance visibility.

6. The electric transport device according to claim 1, wherein the sensor is an optical device for crosswalk recognition, and is configured to communicate with the processor for controlling illumination of the side light such that when the electric transport device traverses a crosswalk the side light is configured to be automatically illuminated by the controller.

7. The electric transport device according to claim 1, wherein the at least one side light emits light outwards in a direction of a plane of the foot deck.

8. The electric transport device according to claim 1, further comprising a side light on each side of the electric transport device to emit light outwards on both sides parallel to the plane of the foot deck.

9. An electric scooter comprising:
   a frame assembly including a foot deck configured for a user to be positioned thereon;
   a wheel assembly connected to the frame assembly;
   a steering assembly pivotally connected to the frame assembly to facilitate steering of the electric vehicle;
   a lighting system including a central rear light disposed on the frame assembly and configured to emit light upwards and forward towards a front of the frame assembly, and at least one side light configured to emit light from a side surface of the frame assembly;
   a dock mounted on the frame assembly and configured to receive a smart phone; and a processor configured to communicate with the smart phone when the smart phone is mounted in the dock;

wherein, when the smart phone is mounted in the dock and when the smart phone communicates a predetermined activity to the processor, the processor automatically illuminates the at least one side light.

10. The electric scooter according to claim 9, wherein the predetermined activity includes the electric scooter approaching a traffic intersection.

11. The electric scooter according to claim 9, wherein the predetermined activity includes the electric scooter crossing a crosswalk in a road.

12. The electric scooter according to claim 11, further comprising a scanner/camera recognition unit, the scanner camera recognition unit configured to determine and communicate to the smart phone when the electric scooter traverses a marking on a road.

13. The electric scooter according to claim 9, wherein the at least one side light emits a constant light.

14. The electric scooter according to claim 9, wherein the at least one side light emits a flashing light.

15. The electric scooter according to claim 9, further comprising a braking system including a user-operated brake configured to slow movement of the electric scooter, wherein said lighting system is configured to emit light having a first parameter during movement of the electric vehicle and said lighting system is configured to emit light having a second parameter when the braking system is actuated, the second parameter being different from the first parameter.

16. A method for automated illumination of lighting on an electric scooter, said method comprising:

providing an electric scooter having a lighting system including at least one light unit disposed on a rear of the electric scooter and configured to emit light upwards and toward a front of the electric scooter, and at least one side light disposed on a side surface of the electric scooter;

transmitting data between infrastructure of an environment and a controller for the lighting system of the electric scooter;

communicating to the controller that the electric scooter is approaching an intersection between two roadways; and automatically activating the side lights on the electric scooter in response to communication that the electric scooter is approaching the intersection.

17. The method according to claim 16, wherein automatically activating the at least one side light on the electric scooter includes only automatically activating the at least one side during predetermined low ambient light conditions.

18. The method according to claim 16, further comprising activating the light unit disposed on the rear of the electric scooter when the electric scooter is operational.

19. The method according to claim 16, wherein activating the side lights includes illuminating the side lights as a constant light.

20. The method according to claim 16, wherein activating the side lights includes illuminating the side lights as a pulsed flashing light.

* * * * *